Figure 1:
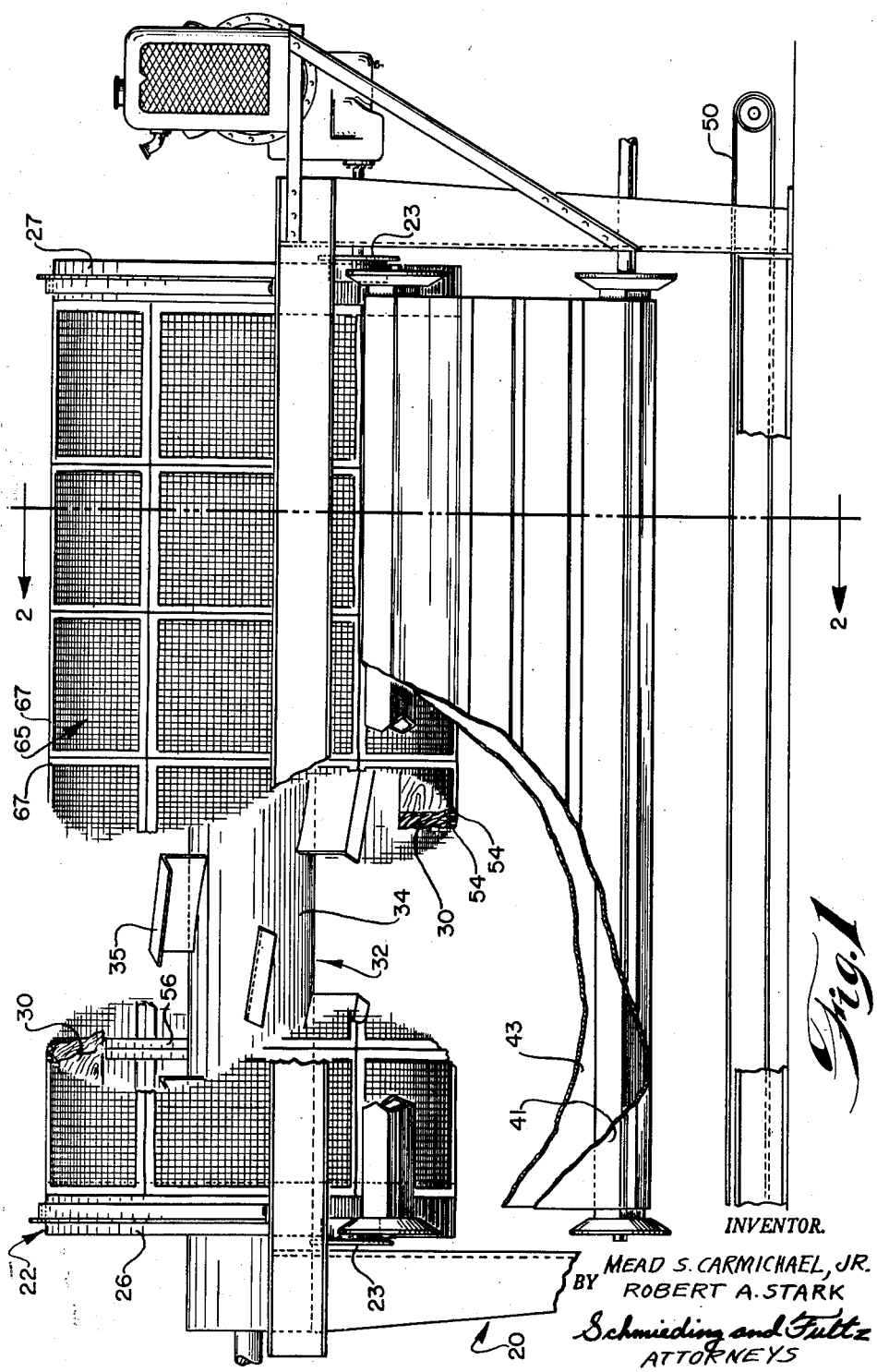

April 30, 1963 M. S. CARMICHAEL, JR., ETAL 3,087,499
METHOD OF HULLING PEAS
Original Filed May 15, 1959 3 Sheets-Sheet 1

INVENTOR.
MEAD S. CARMICHAEL, JR.
BY ROBERT A. STARK
Schmieding and Fultz
ATTORNEYS April 30, 1963 M. S. CARMICHAEL, JR., ETAL 3,087,499
METHOD OF HULLING PEAS
Original Filed May 15, 1959 3 Sheets-Sheet 2

INVENTOR.
MEAD S. CARMICHAEL, JR.
BY ROBERT A. STARK

Schmieding and Fultz
ATTORNEYS

April 30, 1963 M. S. CARMICHAEL, JR., ETAL 3,087,499
METHOD OF HULLING PEAS
Original Filed May 15, 1959 3 Sheets-Sheet 3
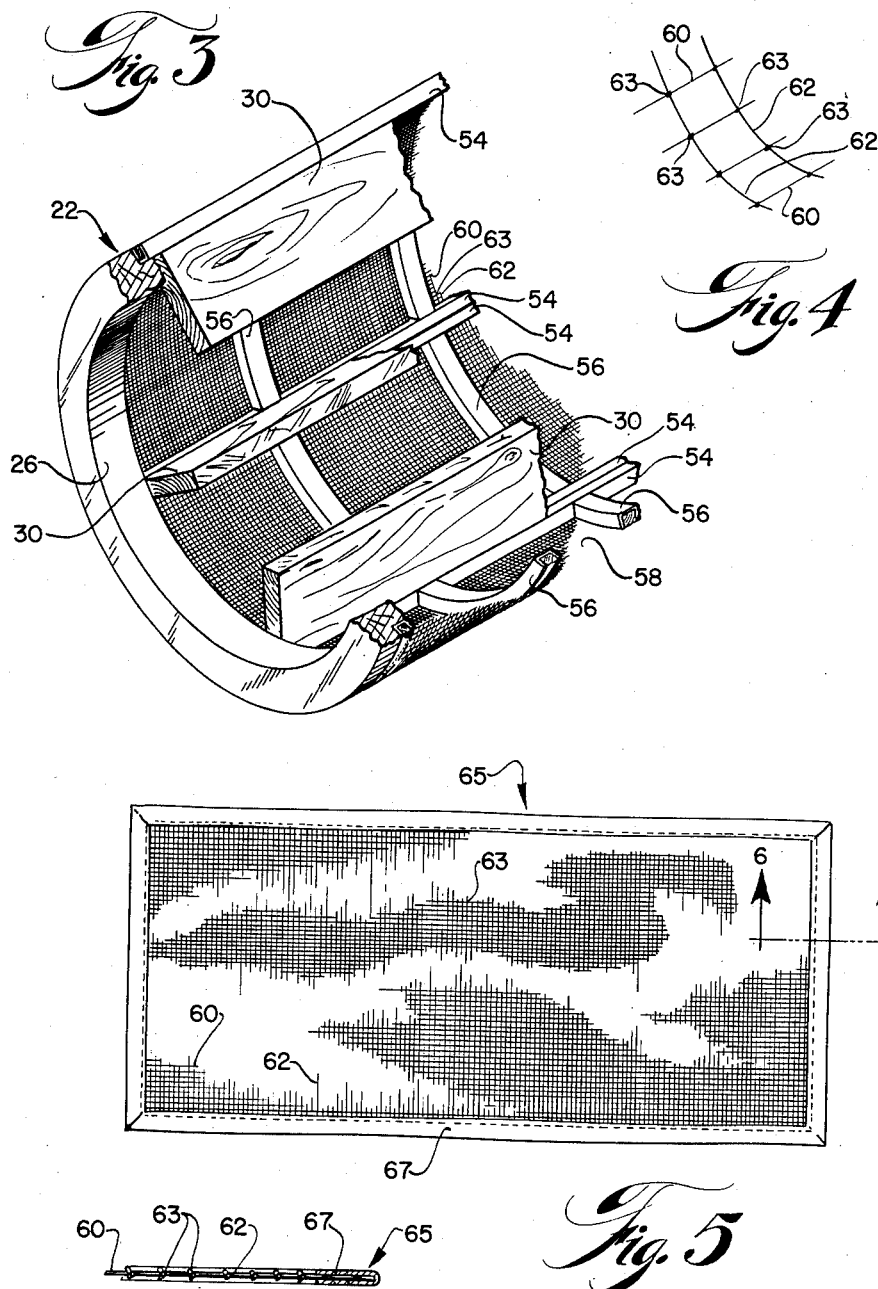
INVENTOR.
MEAD S. CARMICHAEL, JR.
BY ROBERT A. STARK
Schmieding and Fultz
ATTORNEYS United States Patent Office 3,087,499
Patented Apr. 30, 1963

3,087,499
METHOD OF HULLING PEAS
Mead S. Carmichael, Jr., and Robert A. Stark, Columbus, Ohio, assignors, by mesne assignments, to FMC Corporation, San Jose, Calif., a corporation of Delaware
Original application May 15, 1959, Ser. No. 813,594. Divided and this application May 9, 1960, Ser. No. 27,935
3 Claims. (Cl. 130—30)

This invention relates to an improved method for hulling crop and for separating the crop from hulls and vines.

This application is a division of co-pending application Serial No. 813,594 filed May 15, 1959, now abandoned, which is a continuation-in-part of my, now abandoned, co-pending application Serial No. 567,345 filed February 23, 1956.

In general, the method of the present invention is applicable to viners which operate on the impact principle wherein the vines bearing the podded crop are fed into a rotating drum which surrounds a rotating member on which are mounted a plurality of radially outwardly extending beaters. The rotating beaters burst the hulls by impact and the crop moves to the inner peripheral surface of the drum where it passes through small openings and is thereby separated from the vines and hulls. It has been the practice in the art to form the peripheral surface of the drum from metal screen providing openings through which only the crop and very small particles of hull and crop can pass. The vines and hulls are thereby retained within the confines of the drum until discharged from an opening in the end wall thereof. The crop, passing through the holes in the metallic screen, is collected below the drum by suitable crop collecting apparatus.

The above mentioned metallic screens present disadvantages in that such screens are too rigid and hard to handle the crop without damaging same. Moreover, the openings in such rigid screens are prone to become plugged, particularly when moist field conditions are encountered.

According to the present invention it has been discovered that if, in viners of the above described type, the periphery of the rotating drum is provided with open areas across which are disposed resilient strings of nylon filaments and if such strings are mounted in stretched configuration to form a resilient pre-stretched nylon string netting, then the above described disadvantages are completely eliminated. This novel drum construction has been found to not only eliminate crop damage, but, in addition, is completely self-cleaning whereby plugging problems are no longer encountered even when operating under moist field conditions.

The term nylon as used herein may be defined as any long chain polymeric amide which has recurring amide groups as an integral part of the main polymer chain and which is capable of being formed into a filament in which the structural elements are oriented in the direction of the axis.

It is believed that the unique self-cleaning property of the novel drum construction of the present invention results from a unique property of non-adherence between crop particles and nylon filaments.

A netting formed of strings of nylon filaments also possesses the advantageous characteristic of relatively high strength even though the strings are relatively small in diameter and the openings formed therebetween are of relatively large area to permit the ready release of crop particles.

As still another advantageous characteristic, the netting of nylon filaments resiliently provides flexing without stretching permanently out of shape.

It is therefore an object of the present invention to provide a novel method for separating crop from hulls and vines which method eliminates bruising of the crop during the separating operation.

It is another object of the present invention to provide another method for separating crop from hulls and vines when moist field conditions are encountered.

Further objects and advantages of the present invention will be apparent from the following description, reference being had to the accompanying drawings wherein a preferred form of embodiment of the invention is clearly shown.

Figure 2:
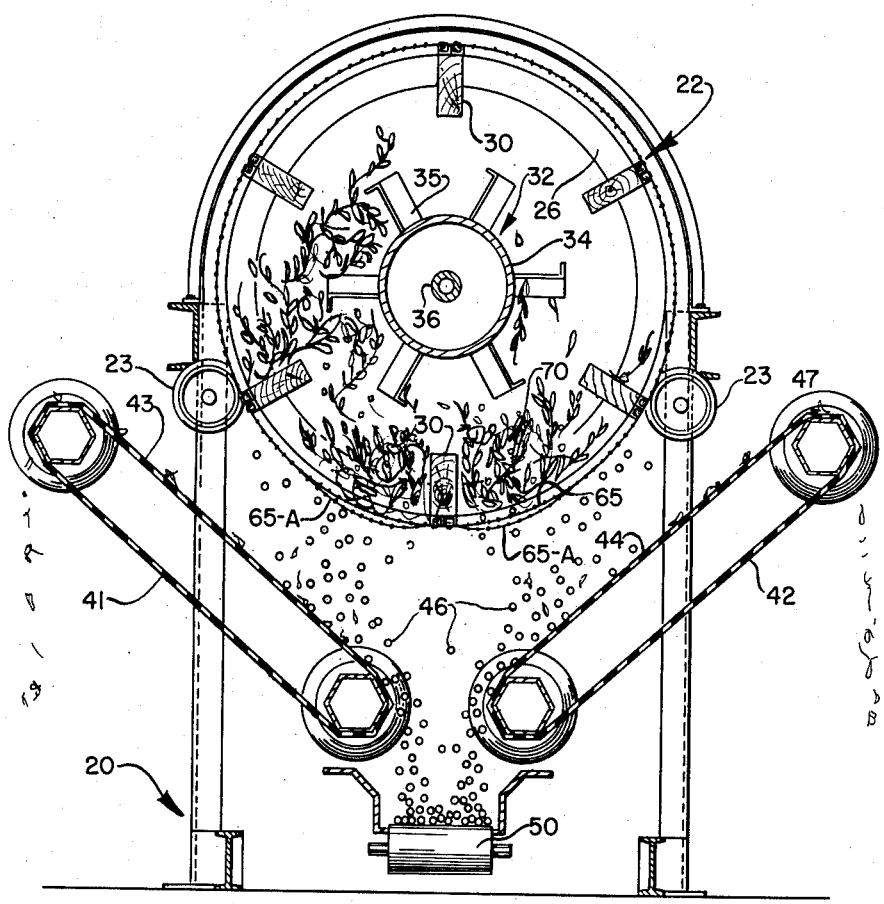

In the drawing:
FIG. 1 is a side elevational view of a viner constructed according to the present invention;
FIG. 2 is a sectional view of the viner of FIG. 1 with the section being taken along the line 2—2 of FIG. 1;
FIG. 3 is a partial perspective view of a rotatable drum comprising a portion of the machine of the preceding figures;
FIG. 4 is a partial perspective view of the resilient string screen construction;
FIG. 5 is a plan view of the resilient string screen construction utilized with the present invention; and
FIG. 6 is a partial sectional view in enlarged scale of the screened construction of FIG. 5 with the section being taken along the line 6—6 of FIG. 5.

Reference is next made to FIG. 1 of the drawing which illustrates the side view of a viner having a supporting frame indicated generally at 20. A drum 22 is rotatably supported on the frame by a plurality of rollers 23 which engage the peripheral outer surfaces of drum frame members 26 and 27. A plurality of longitudinal members 30 are disposed between the members 26 and 27 and comprise a portion of the drum frame as well as providing radially inwardly extending blades for tumbling the vines.

As is best seen in FIG. 2, a beater means 32 is rotatably disposed within drum 22 for coaxial rotation therewith and comprises a cylinder 34 which supports a plurality of radially extending beaters 35. The ends of cylinder 34 include stub shafts 36 which are journalled in bearing means and driven by a suitable prime mover.

A pair of inclined separating aprons 41 and 42 are supported by frame 20 and located beneath the drum 22. Such aprons form continuously moving surfaces 43 and 44 upon which the crop 46 and small particles 47 of hull and stalk are dropped. The inclination of surfaces 43 and 44 is arranged at an appropriate angle at which the relatively round crop 46 will roll downwardly and into crop collecting means 50. The small particles 47 of hull and crop, being of a configuration not adapted to roll downwardly along the inclined surfaces 43 and 44, are carried upwardly by such moving surfaces and discharged over the top edges thereof.

Referring next to FIG. 3 the periphery of drum 22 is provided with a plurality of longitudinally extending members 54 and a plurality of circumferentially extending arcuately shaped members 56. The members 54 may be mounted on the outer edge of the blade members 30 as illustrated in FIG. 3. As a result of this construction the peripheral surface of drum 22 includes a plurality of spaces 58 which are devoid of any structural members. Each of such spaces 58 is provided with a plurality of equally spaced longitudinally disposed resilient strings 60 and a plurality of equally spaced circumferentially extending resilient strings 62. The strings 60 and 62 are secured together at the intersections 63 thereof.

The longitudinal resilient strings 60 are preferably disposed in a pre-stretched condition between the members 56 and the circumferential resilient strings 62 may likewise be pre-stretched between the spaced members 54.

In applying the resilient strings 60 and 62, such strings may be pre-assembled to form a resilient netting illustrated at 65 in FIGS. 4 and 5. The borders of netting 65 are provided with strips of fabric 67 which may be lapped over the edge as illustrated in FIG. 5.

The longitudinal and lateral dimensions of the netting 65 of FIG. 5 are selected to be less, by an appropriate amount, than the dimensions of the frame sides of the openings 58 over which the nettings 65 are to be stretched.

A netting 65 may be applied to an opening 58 by means of staples driven through the fabric edge 67. When this is being done the netting 65 is stretched between opposite frame members and care should be exercised to avoid piercing any of the stretched strings 60 and 62 with the staples.

Referring again to FIG. 2, the nettings 65 are illustrated in a normal pre-stretched configuration at 65, and schematically illustrated in an outwardly flexed configuration by the dotted delineation indicated at 65-A. The netting 65 serves to retain the particles of hull and stalk 70 within the confines of the drum 22, against the action of centrifugal force, which action serves to flex the resilient netting 65 radially outwardly when cylinder 22 is rotated with the load 70 against netting 65. Such flexing action of the resilient netting 65 enables the crop 46 to pass readily through the openings therein without bruising the crop, and, moreover, such flexing action prevents particles of vine and hull from lodging in the openings in the netting and from plugging same.

While the form of embodiment of the present invention as herein disclosed constitutes a preferred form, it is to be understood that other forms might be adopted, all coming within the scope of the claims which follow:

We claim:

1. The method of separating a crop from vines and hulls bearing same, which method comprises subjecting the hulls and vines containing the crop to impact action to burst said hulls and dislodge the crop; centrifugally impelling said dislodged crop, hulls and vines outwardly against a resilient perforated cylindrical moving wall formed by spaced intersecting resilient nylon strings that are joined together at intersections, said impelling of said crop, hulls, and vines against said wall causing outwardly flexing of said wall and expension of the openings formed by said strings; resiliently urging said dislodged crop hulls, and vines inwardly by return movement of said outwardly yielded flexing wall whereby said openings are contracted, said action of said resilient wall and openings serving to prevent clogging of said openings; separating said crop from said particles of small size and delivering said separated crop to a collecting zone.

2. The method of separating a crop from vines and hulls bearing same, which method comprises subjecting the hulls and vines containing the crop to impact action to burst said hulls and dislodge the crop; centrifugally impelling said dislodged crop, hulls and vines outwardly against a resilient perforated cylindrical moving wall formed by spaced intersecting resilient nylon strings that are joined together at intersections and normally disposed in stretched configuration, said impelling of said crop, hulls, and vines against said wall causing outwardly flexing of said wall and expansion of the openings formed by said strings resiliently urging said dislodged crop, hulls, and vines inwardly by return movement of said outwardly yielded flexing wall whereby said openings are contracted, said action of said resilient wall and openings serving to prevent clogging of said openings; separating said crop from said particles of small size and delivering said separated crop to a collecting zone.

3. The method of separating a crop from vines and hulls bearing same, which method comprises introducing the hulls and vines containing the crop to a hull-opening zone in which said crop is dislodged from said hulls; centrifugally impelling said dislodged crop, hulls and vines outwardly against a resilient perforated cylindrical moving wall formed by spaced intersecting resilient nylon strings that are joined together at intersections, said impelling of said crop, hulls, and vines against said wall causing outwardly flexing of said wall and expansion of the openings formed by said strings; resiliently urging said dislodged crop, hulls, and vines inwardly by return movement of said outwardly yielded flexing wall whereby said openings are contracted, said action of said resilient wall and openings serving to prevent clogging of said openings; separating said crop from said particles of small size and delivering said separated crop to a collecting zone.

References Cited in the file of this patent
UNITED STATES PATENTS

| | | |
|---|---|---|
| 1,107,207 | Scott | Aug. 11, 1914 |
| 1,263,130 | Scott | Apr. 16, 1918 |
| 1,340,607 | Hamachek | May 18, 1920 |
| 1,361,051 | Hamachek | Dec. 7, 1920 |
| 1,405,914 | Hamachek | Feb. 7, 1922 |
| 1,488,015 | McDonald | Mar. 25, 1924 |